Jan. 25, 1938.    W. B. TANNER    2,106,579
MANUFACTURE OF FORMAMIDE
Filed March 30, 1936
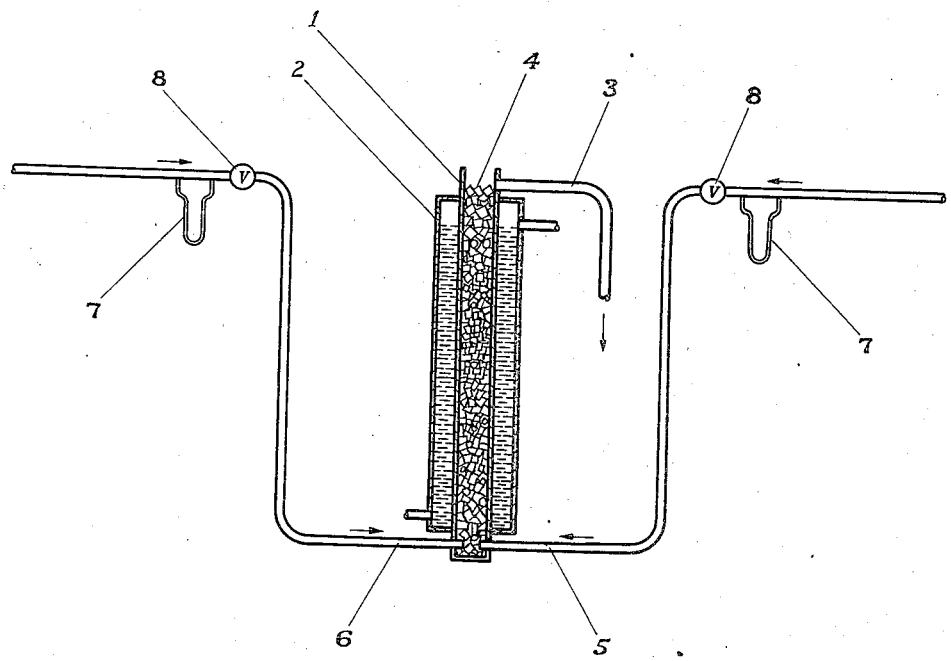
INVENTOR.
WALTON BARR TANNER
BY
ATTORNEY.

Patented Jan. 25, 1938

2,106,579

UNITED STATES PATENT OFFICE 2,106,579

MANUFACTURE OF FORMAMIDE

Walton Barr Tanner, Niagara Falls, N. Y., assignor to E. I. du Pont de Nemours & Company, Wilmington, Del., a corporation of Delaware Application March 30, 1936, Serial No. 71,727

19 Claims. (Cl. 260—124)

This invention relates to the manufacture of formamide and more particularly to its manufacture from alkyl formates and ammonia.

It is known that formamide is produced very slowly when anhydrous or aqueous ammonia is allowed to act on alkyl formates. This reaction may be caused to proceed more rapidly and completely by employing ammonia at pressures greater than one atmosphere according to the method of U. S. Patent 1,567,312.

These known methods of producing formamide possess various undesirable features. By them the reaction is slow or the process requires the employment of special and expensive pressure sustaining equipment. Such processes obviously possess serious objections when considered from a commercial standpoint.

An object of this invention is to provide a new and improved method for producing formamide from alkyl formates and ammonia. The invention has as another object a method for producing formamide by a simple process without elaborate equipment and under conditions of low temperatures and pressures. A still further object is the preparation of formamide by a simple and continuous process. These and still further objects will be apparent from the following description of this invention.

These objects are attained in accordance with the present invention by reacting an alkyl formate with ammonia in a non-aqueous medium containing formamide and one or more aliphatic alcohols and separating the formamide produced from the mixture by distillation. By this method, formamide may be produced simply and advantageously at ordinary temperatures and at substantially atmospheric pressure without the necessity of employing elaborate equipment such as that required for operating under pressures greater than one atmosphere.

I have found that by employing a mixture of formamide and one or more aliphatic alcohols as the reaction medium an alkyl formate and ammonia are caused to react very quickly and nearly completely under ordinary temperatures and pressures. The reactants may be conveniently brought together in the reaction medium by adding the formate as a liquid and the ammonia as a gas. Fractional distillation of the reaction mixture yields a residue consisting of practically pure formamide.

When methyl formate, for example, is added to an equimolecular mixture of formamide and methyl alcohol and gaseous ammonia is passed into the mixture at ordinary temperatures and atmospheric pressure, the ammonia is rapidly absorbed and heat is evolved due to the reaction that takes place according to the following equation:

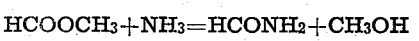

$$HCOOCH_3 + NH_3 = HCONH_2 + CH_3OH$$

Under these conditions, this reaction has been found to be nearly instantaneous at ordinary temperatures until about 97% of the conversion has been obtained, after which the reaction rate becomes slower and several hours are needed to realize the remaining 3% conversion. The reaction equilibrium is not greatly affected by temperature over the range of 10–60° C. and at 20° C. the mixture under equilibrium conditions consists of approximately 99% formamide and methanol.

The slow conversion rate in the final stages makes it undesirable to operate at too high temperatures, since the solubility of the ammonia becomes less as the temperature rises. The conversion of methyl formate to formamide may be effectively carried out at a temperature of 60° C. but due to the decreased solubility of ammonia in the reaction mixture at this temperature it is necessary to introduce the reactants at lower rates than when operating at lower temperatures. Otherwise some ammonia passes through the mixtures unreacted and unreacted formate remains in the reaction medium or may pass through the mixture. I prefer, therefore, to operate my process at relatively low temperatures.

When the reaction is carried out at a temperature of 30–35° C., a more satisfactory conversion results than at 60° C. However I prefer using a still lower temperature, preferably in the range of 10–20° C.

The process in accordance with my invention is excellently adapted for continuous operation. To accomplish this end, equimolecular quantities, for example, of methyl formate and gaseous ammonia may be introduced at uniformly continuous rates into the bottom of a column of liquid consisting of a mixture of formamide and methyl alcohol which is cooled by any suitable means to avoid excessive temperature rises. As the introduction of the reactants is continued, the products of the reaction overflow the container holding the reaction medium and are collected. The mixture thus obtained may be distilled immediately to remove the methyl alcohol and leave a residue of practically pure formamide, or it may be allowed to stand for a time to more completely effect the reaction and then be subsequently distilled.

The accompanying drawing illustrates one type of apparatus that is suitable for use in practicing my invention. Tower 1, in which the reaction medium is contained, is surrounded by a cooling jacket 2 and is fitted with an overflow conduit 3. The interior of tower 1 is filled with packing material 4, such as Raschig rings or pieces of ceramic ware and then filled with a liquid reaction medium which contains formamide and an aliphatic alcohol. The ammonia delivery conduit 5 and the alkyl formate delivery conduit 6 which preferably project into the bottom portion of the packed tower 1, deliver ammonia and alkyl formate, respectively, to the reaction medium. In operation, the rate of introduction of the reactants into the reaction medium is determined and regulated by means of flowmeters 7 and valves 8, respectively, and the temperature of the reaction medium is regulated as desired by passing liquid of a suitable temperature through cooling jacket 2. As the reaction proceeds, the reaction products overflow through conduit 3 and may be collected and treated as desired in suitable means not shown.

My invention is further illustrated by the following example:

A water-jacketed pyrexed glass tube 2" in diameter and 24" long is packed with glass Raschig rings. Gaseous ammonia and methyl formate are simultaneously introduced through flow meters to the base of the column which is previously filled with an equimolecular mixture of formamide and methyl alcohol and which is cooled to a temperature of 10-20° C. As the reaction proceeds the reaction products continually overflow from the top of the column and are collected.

In carrying out the manufacture of formamide by the process described above, the results tabulated below were obtained.

In practicing my invention it is preferable to allow the mixture of reaction products to stand a few hours before separating the formamide in order to obtain as complete conversion as possible. However, if desired, distillation may be carried out immediately. If this is done the distillate, consisting mainly of methyl alcohol, will contain small amounts of unreacted formate and ammonia as well as small amounts of formamide. The distillate, therefore, is a suitable medium in which the unreacted constituents may further react. After said period of standing the distillate may be redistilled to give essentially pure methyl alcohol (depending upon whether an excess of one or the other reactants was used) and a residue of formamide and alcohol. This residue may be added advantageously to the mixture of reaction products collected from the reaction column thereby increasing the recovery of formamide.

The separation of formamide from the reaction mixture may be effected by any suitable evaporation or distillation method, such as; by fractional distillation at ordinary pressure, by fractional distillation under reduced pressures, or by flash distillation methods which may consist in dropping or running the reaction mixture upon surfaces, the temperature of which is sufficiently high to immediately volatilize the alcohol and leave a residue of practically pure formamide but not sufficiently high to cause decomposition of the formamide. Distillation may likewise be carried out in either a continuous or discontinuous manner.

Methyl formate has been used in illustrating my invention because it can be rapidly obtained by the action of carbon monoxide on methyl alcohol with the aid of catalysts. However, it is understood that other alkyl formates or mixtures

| Time in minutes | Feed rates (grams per min.) | | Molecular ratio of methyl formate to ammonia | Free ammonia in reactor samples (percent) | Analysis of overflow samples | | | | |
|---|---|---|---|---|---|---|---|---|---|
| | | | | | Free ammonia when collected (percent) | 24 hours after collection | | | |
| | Methyl formate | Ammonia | | | | Free ammonia (percent) | Formamide (percent) | Methyl alcohol (percent) | Methyl formate (percent) |
| Start | 6.8 | 1.64 | 1.12:1 | | | | | | |
| 15 | 6.8 | 1.64 | 1.12:1 | 3.2 | | | | | |
| 25 | 6.8 | 1.64 | 1.12:1 | 3.9 | | | | | |
| 30 | 6.8 | 1.64 | 1.12:1 | | } | 0.01 | 53.4 | 38.1 | 8.5 |
| 35 | 6.8 | 1.25 | 1.54:1 | | | | | | |
| 50 | 6.8 | 1.25 | 1.54:1 | 3.1 | } 1.35 | 0.017 | 46.6 | 33.1 | 20.3 |
| 55 | 6.8 | 1.25 | 1.54:1 | 3.2 | | | | | |
| 60 | 6.8 | 1.25 | 1.54:1 | | | | | | |

Note: The values in the fifth column of the table were obtained for samples removed from the bottom of the reaction column at the point where the main reaction occurred.

In practice, it is advantageous to employ equimolecular quantities of the alkyl formate and ammonia, although an excess of one or the other may be used if desired. In a run made by the method described in the above example at a temperature of 10-20° C., using feed rates of approximately 6.8 and 1.92 grams per minute, respectively, of methyl formate and ammonia which correspond to a 1:1 molecular mixture of the reactants, the product obtained initially contained 3.5% unreacted ammonia. The composition, after the product had stood 24 hours at room temperature, was:

|  | Percent |
|---|---|
| Free ammonia | 0.92 |
| Formamide | 58.0 |
| Methyl alcohol | 41.2 |
| Methyl formate | 0.0 |
| Total | 100.12 | of alkyl formates may be used with equal success. It is obvious that in order to facilitate an easy and complete separation of formamide from the reaction mixture it is desirable that an alkyl formate be used whose corresponding alcohol does not have a boiling point too close to the boiling point of formamide. In addition, it is generally advantageous to use alkyl formates whose corresponding alcohols have relatively low boiling points making possible an effective separation of the alcohol or alcohols from formamide at temperatures which will not cause decomposition or polymerization reactions to occur.

In addition, other solvent mixtures may be used. Any mixture that does not react with the alkyl formate or ammonia, or with their reaction products, and that contains some formamide and an aliphatic alcohol or alcohols is suitable.

My invention may also be practiced in a number of manners differing from those described above, for example it may be carried out by a discontinuous method of operation by which the alkyl formate is added first to the mixture of formamide and an aliphatic alcohol with subsequent addition of anhydrous ammonia. Similarly, quantities of the reactants may be added alternately to the reaction medium. Methods employing various stirring and cooling devices may be used. If desired, ammonia and the alkyl formate may be mixed prior to passing them into the reaction medium. In addition, various types of packing materials or baffles may be used in the reaction vessel or the reaction may be carried out in the absence of these devices. Further, the alkyl formate may be added to the liquid reaction mixture in the form of its vapors. It is also evident that the manufacture of formamide may be carried out in accordance with my invention in equipment other than glass, for example aluminum equipment may be used.

It is understood that my invention is not limited by the examples and modifications described above, but that it covers all methods for manufacturing formamide by the new and improved invention herein disclosed.

I claim:

1. A process for manufacturing formamide comprising reacting an alkyl formate with anhydrous ammonia in a liquid reaction medium comprising a mixture of formamide and an aliphatic alcohol at a pressure not substantially greater than one atmosphere.

2. A process for manufacturing formamide comprising reacting an alkyl formate with anhydrous ammonia in a liquid reaction medium comprising a mixture of formamide and an aliphatic alcohol at a pressure not substantially greater than one atmosphere and at a temperature of 10° to 60° C.

3. A process for manufacturing formamide comprising reacting an alkyl formate with anhydrous ammonia in a liquid reaction medium comprising a mixture of formamide and an aliphatic alcohol at a pressure not substantially greater than one atmosphere and at a temperature of 10° to 20° C.

4. A process for manufacturing formamide comprising reacting methyl formate with anhydrous ammonia in a liquid reaction medium comprising a mixture of formamide and an aliphatic alcohol at a pressure not substantially greater than one atmosphere.

5. A process for manufacturing formamide comprising reacting methyl formate with anhydrous ammonia in a liquid reaction medium comprising a mixture of formamide and an aliphatic alcohol at a pressure not substantially greater than one atmosphere and at a temperature of 10° to 60° C.

6. A process for manufacturing formamide comprising reacting methyl formate with anhydrous ammonia in a liquid reaction medium comprising a mixture of formamide and an aliphatic alcohol at a pressure not substantially greater than one atmosphere and at a temperature of 10° to 20° C.

7. A process for manufacturing formamide comprising reacting methyl formate with anhydrous ammonia in a liquid reaction medium comprising a mixture of formamide and methyl alcohol at a pressure not substantially greater than one atmosphere.

8. A process for manufacturing formamide comprising reacting methyl formate with anhydrous ammonia in a reaction medium comprising a mixture of formamide and methyl alcohol at a pressure not substantially greater than one atmosphere and at a temperature of 10° to 60° C.

9. A process for manufacturing formamide comprising reacting methyl formate with anhydrous ammonia in a reaction medium comprising a mixture of formamide and methyl alcohol at a pressure not substantially greater than one atmosphere and at a temperature of 10° to 20° C.

10. A process for manufacturing formamide comprising reacting methyl formate with anhydrous ammonia in a liquid reaction medium comprising an equimolecular mixture of formamide and methyl alcohol at a pressure not substantially greater than one atmosphere.

11. A process for manufacturing formamide comprising reacting methyl formate with anhydrous ammonia in a reaction medium comprising an equimolecular mixture of formamide and methyl alcohol at a pressure not substantially greater than one atmosphere and at a temperature of 10° to 60° C.

12. A process for manufacturing formamide comprising reacting methyl formate with anhydrous ammonia in a reaction medium comprising an equimolecular mixture of formamide and methyl alcohol at a pressure not substantially greater than one atmosphere and at a temperature of 10° to 20° C.

13. A continuous process for the manufacture of formamide comprising adding methyl formate at a uniform rate to the bottom of a column filled with an equimolecular mixture of formamide and methyl alcohol at a pressure not substantially greater than one atmosphere, the temperature of said mixture being regulated to 10° to 60° C., and simultaneously passing into the bottom of the column of the formamide and methanol mixture by means of a separate delivery tube, gaseous ammonia at a uniform rate molecularly equivalent to the rate at which methyl formate is added to the column, and collecting the reaction products comprising equimolecular quantities of formamide and methyl alcohol as it overflows from the top of the column and separating formamide from this mixture by distillation.

14. A continuous process for the manufacture of formamide comprising adding methyl formate at a uniform rate to the bottom of a column filled with an equimolecular mixture of formamide and methyl alcohol at a pressure not substantially greater than one atmosphere, the temperature of said mixture being regulated to 10° to 20° C., and simultaneously passing into the bottom of the column of the formamide and methanol mixture by means of a separate delivery tube, gaseous ammonia at a uniform rate molecularly equivalent to the rate at which methyl formate is added into the column, and collecting the reaction products comprising equimolecular quantities of formamide and methyl alcohol as it overflows from the top of the column and separating formamide from this mixture by distillation.

15. A continuous process for the manufacture of formamide comprising passing a continuous equimolecular mixture of methyl formate and gaseous ammonia into the bottom of a column filled with an equimolecular mixture of formamide and methyl alcohol at a pressure not substantially greater than one atmosphere, the temperature of said mixture being regulated to 10° to 60° C., and collecting the reaction products as they overflow from the top of the column and distilling them leaving a residue of formamide.

16. A process for manufacturing formamide comprising reacting an alkyl formate with anhydrous ammonia in a liquid reaction medium comprising a mixture of formamide and an aliphatic alcohol, at substantially atmospheric pressure and at a temperature of 10° to 60° C.

17. A process for manufacturing formamide comprising reacting an alkyl formate with anhydrous ammonia in a liquid reaction medium comprising a mixture of formamide and an aliphatic alcohol, at substantially atmospheric pressure and at a temperature of 10° to 20° C.

18. A process for manufacturing formamide comprising reacting methyl formate with anhydrous ammonia in a reaction medium comprising an equimolecular mixture of formamide and methyl alcohol, at substantially atmospheric pressure and at a temperature of 10° to 60° C.

19. A process for manufacturing formamide comprising reacting methyl formate with anhydrous ammonia in a reaction medium comprising an equimolecular mixture of formamide and methyl alcohol, at substantially atmospheric pressure and at a temperature of 10° to 20° C.

WALTON BARR TANNER.